United States Patent [19]
Hara et al.

[11] Patent Number: 6,130,344
[45] Date of Patent: Oct. 10, 2000

[54] PROCESS FOR PRODUCING COMPOUND HAVING EPOXY GROUP

[75] Inventors: Yoshinoro Hara; Hiroko Takahashi, both of Kanagawa, Japan

[73] Assignee: Mitsubishi Chemical Corporation, Tokyo, Japan

[21] Appl. No.: 09/199,779

[22] Filed: Nov. 25, 1998

[30] Foreign Application Priority Data

Nov. 27, 1997 [JP] Japan ................................. 9-325698

[51] Int. Cl.⁷ ...................... C07D 301/00; C07D 303/27
[52] U.S. Cl. ............................................ 549/540; 549/560
[58] Field of Search ..................... 549/540, 560

[56] References Cited

U.S. PATENT DOCUMENTS

| | | | |
|---|---|---|---|
| 3,336,241 | 8/1967 | Shokal | 525/507 |
| 4,847,394 | 7/1989 | Schuster | 549/540 |
| 5,614,646 | 3/1997 | Wettling et al. | 549/540 |
| 6,060,611 | 5/2000 | Hara | 549/540 |

FOREIGN PATENT DOCUMENTS

| | | |
|---|---|---|
| 0 545 154 | 6/1993 | European Pat. Off. . |
| 0 597 806 | 5/1994 | European Pat. Off. . |
| 0 678 512 | 10/1995 | European Pat. Off. . |
| 0 678 513 | 10/1995 | European Pat. Off. . |
| 8-53370 | 2/1996 | Japan . |
| 10-204002 | 8/1998 | Japan . |

*Primary Examiner*—Fiona T. Powers
*Attorney, Agent, or Firm*—Oblon, Spivak, McClelland, Maier & Neustadt, P.C.

[57] ABSTRACT

Disclosed is a process for producing a compound having at least one epoxy group, which comprises: subjecting a compound having at least one carbon—carbon unsaturated bond and at least one epoxy group to selective hydrogenation in the presence of a catalyst comprising at least one of rhodium and ruthenium supported on a carbonaceous support, the carbonaceous support having a specific surface area of from 5 to 600 m²/g, to thereby selectively hydrogenate the at least one carbon—carbon unsaturated bond.

10 Claims, No Drawings

PROCESS FOR PRODUCING COMPOUND HAVING EPOXY GROUP

TECHNICAL FIELD

The present invention relates to a process for producing a compound having at least one epoxy group. More particularly, this invention relates to a process in which a specific catalyst is used to selectively hydrogenate the unsaturated bond(s) of a compound having at least one epoxy group and at least one carbon—carbon unsaturated bond.

The compound having at least one epoxy group obtained by the present invention is industrially exceedingly useful in applications such as, e.g., paints, coating materials, and binder resins.

BACKGROUND ART

Bisphenol A epoxy resins obtained by reacting epichlorohydrin with bisphenol A have conventionally been used extensively as general-purpose epoxy resins in applications such as coating materials, electrical insulating materials, laminates, structural materials, etc. However, the bisphenol type epoxy resins have insufficient weatherability because they have aromatic rings. For use in applications where weatherability is especially required, compounds obtained by epoxidizing cyclohexene type alicyclic olefins with peracetic acid are commercially available as weatherable epoxy compounds.

On the other hand, in place of the epoxidation with peracetic acid, various proposals have conventionally been made on attempts to hydrogenate the aromatic rings of a bisphenol type epoxy resin to produce the corresponding alicyclic epoxy resin. In this nucleus hydrogenation, epoxy group decomposition should be minimized.

For example, U.S. Pat. No. 3,336,241 or JP-A-10-204002 (the term "JP-A" as used herein means an "unexamined published Japanese patent application") proposes a method in which an organic compound having at least one vic-1,2-epoxy group and at least one C—C double bond is hydrogenated using a catalyst comprising rhodium or ruthenium supported on active carbon. In U.S. Pat. No. 4,847,394 and JP-A-8-53370 is proposed a method in which a homogeneous ruthenium catalyst obtained through reduction with a compound having a specific oxidation-reduction potential is used.

However, the former method has problems that the catalytic activity is low and a considerable proportion of the epoxy groups are hydrogenated and decomposed. In addition, the active carbon used is a support having a large specific surface area. The latter method, although excellent in catalytic activity and selectivity, has problems concerning catalyst recovery and reuse because it is not a support-based catalyst and, hence, the ruthenium, which is expensive, is difficult to be completely separated from the reaction product.

SUMMARY OF THE INVENTION

An object of the present invention is to provide a method using a novel catalyst which, when used in the selective hydrogenation of a compound having at least one epoxy group, is effective in selectively hydrogenating the carbon—carbon unsaturated bond(s) and can be easily separated from the reaction product.

The present inventors made intensive studies in order to accomplish the above object. As a result, they have found that when a catalyst comprising rhodium or ruthenium supported on a carbonaceous support having a specific surface area is used in the hydrogenation, the carbon—carbon unsaturated bond(s) of the compound having at least one epoxy group can be selectively hydrogenated and the catalyst can be easily separated. The present invention has been completed based on this finding.

The present invention provides a process for producing a compound having at least one epoxy group which comprises subjecting a compound having at least one carbon—carbon unsaturated bond and at least one epoxy group to selective hydrogenation in the presence of a catalyst comprising rhodium or ruthenium supported on a carbonaceous support having a specific surface area of from 5 to 600 $m^2/g$ to thereby selectively hydrogenate the carbon—carbon unsaturated bond(s) of the compound.

According to preferred embodiments of the present invention, the following are provided: the process described above wherein the at least one carbon—carbon unsaturated bond is a component of an aromatic ring (forms an aromatic ring); the process described above wherein the carbonaceous support is a graphite; the process described above wherein the catalyst comprises rhodium supported on the carbonaceous support; the process described above wherein the catalyst is one obtained by a method comprising supporting a rhodium compound or a ruthenium compound on the carbonaceous support and subjecting the support having the rhodium or ruthenium compound to reduction treatment in a liquid phase; the process described above wherein the catalyst is one obtained by a method comprising supporting a rhodium compound or a ruthenium compound on the carbonaceous support, subsequently treating the support having the rhodium or ruthenium compound with an alkaline aqueous solution, and then subjecting the treated support to reduction treatment in a liquid phase; the process described above wherein an ether is used as a reaction solvent; the process described above wherein the hydrogenation reaction is conducted at a temperature of from 30 to 150° C. and a pressure of from 1 to 30 MPa; the process described above wherein the compound having at least one carbon—carbon unsaturated bond and at least one epoxy group is an aromatic compound having at least one epoxy group; and the process described above wherein the aromatic compound having at least one epoxy group is a compound obtained by reacting epichlorohydrin with a polyhydric phenol.

MODES FOR CARRYING OUT THE INVENTION

The present invention will be explained below in detail.

The starting material used in the present invention is a compound having at least one carbon—carbon unsaturated bond and at least one epoxy group. This compound may be any of a monomer, oligomer, and polymer.

Examples thereof include aromatic compounds, unsaturated aliphatic compounds, unsaturated alicyclic compounds, and unsaturated heterocyclic compounds each having at least one epoxy group. Preferred among these are compounds having carbon—carbon unsaturated bonds as components of an aromatic ring (compounds where the carbon—carbon unsaturated bonds form an aromatic ring).

Specific examples of such aromatic compounds having at least one epoxy group include styrene oxide, phenyl glycidyl ether, diglycidyl ether of hydroquinone, diglycidyl ether of resorcin, epoxy resins obtained from epichlorohydrin and either bisphenol A or bisphenol F and represented by the following general formula (I):

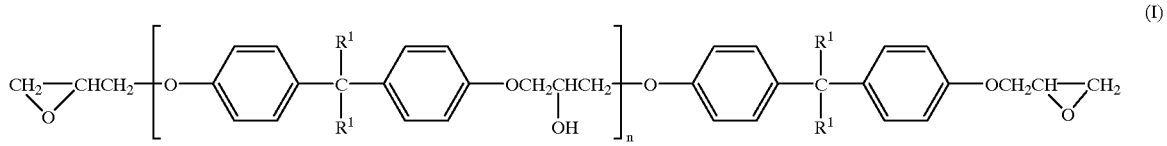

(wherein $R^1$ represents a hydrogen atom or a methyl group, and n represents an integer of 0 to 40), and polyglycidyl ethers of phenol-novolac or cresol-novolac resin, which are represented by the following general formula (II):

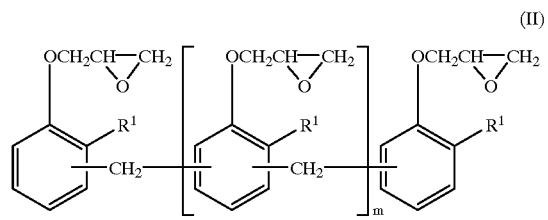

(wherein $R^1$ represents a hydrogen atom or a methyl group, and m represents an integer of 0 to 40).

Preferred among the above aromatic compounds having at least one epoxy group are those obtained by reacting polyhydric phenols such as, e.g., hydroquinone, resorcin, bisphenol A, bisphenol F, phenol-novolac resins, and cresol-novolac resins with epichlorohydrin.

Especially preferred are the bisphenol A type epoxy resins (diglycidyl ethers of bisphenol A) and bisphenol F type epoxy resins (diglycidyl ethers of bisphenol F) represented by formula (I) and polyglycidyl ethers of o-cresol-novolac represented by formula (II).

Commercial products of these especially preferred epoxy compounds are produced by Yuka Shell Epoxy K.K. Specifically, diglycidyl ethers of bisphenol A represented by formula (I) are available under the trade names of, e.g., Epikote 827 (n=0–3), 828 (n=0–3), 834 (n=0–5), 1001, 1002, 1004, 1007, and 1009; diglycidyl ethers of bisphenol F represented by formula (I) are available under the trade names of, e.g., Epikote 806 and 807; and polyglycidyl ethers of o-cresol-novolac represented by formula (II) are available under the trade names of, e.g., Epikote 152 ($R^1$=hydrogen atom, n=0–10), 154 ($R^1$=hydrogen atom, n=0–10), and 180S65 ($R^1$=methyl, n=0–10).

The hydrogenation catalyst used in the present invention comprises a carbonaceous support having a specific surface area of from 5 to 600 $m^2/g$ and either rhodium or ruthenium supported on the support.

The carbonaceous support having a specific surface area used in the catalyst is preferably a graphite, in particular, one called high surface area graphite. Although the reason for the preference of a graphite has not been elucidated, it is thought that a graphite undergoes interaction especially with unsaturated bonds to thus contribute to selective hydrogenation. The specific surface area of the carbonaceous support is preferably from 10 to 400 $m^2/g$, more preferably from 50 to 300 $m^2/g$, most preferably from 100 to 250 $m^2/g$.

If a general active carbon having a large specific surface area is used, substrates are less apt to enter the pores because of the small pore diameter of the active carbon, resulting in reduced activity. In contrast, the carbonaceous support having a specific surface area used in the present invention is thought to bring about improved activity because the interaction between the supported metal and substrates is enhanced due to the large pore diameter of the support. The support should be carbonaceous and have a pore diameter which is large in some degree. For example, even when a silica support having almost the same specific surface area and pore diameter is used, its activity is exceedingly low.

The rhodium or ruthenium to be supported on the carbonaceous support is not particularly limited as long as it is in the form of a thermally decomposable rhodium or ruthenium compound. Examples of the rhodium compound include inorganic salts such as rhodium chloride, rhodium nitrate, and rhodium sulfate, organometallic compounds such as rhodium acetylacetonate, and coordination compounds such as tetrarhodium dodecacarbonyl. Examples of the ruthenium compound include inorganic salts such as ruthenium chloride and ruthenium nitrate nitrosyl, organometallic compounds such as ruthenium acetylacetonate, and coordination compounds such as triruthenium dodecacarbonyl. Especially preferred among these are the rhodium compounds because higher activity is obtained therewith.

The supporting amount of rhodium or ruthenium as a metallic component is not particularly limited. However, too small supporting amounts result in a less effective catalyst, while too large supporting amounts are disadvantageous in cost. Consequently, rhodium or ruthenium is contained in an amount of preferably from 1 to 10% by weight, more preferably from 2 to 8% by weight. The catalyst of the present invention may contain metallic components other than rhodium and ruthenium.

Methods for supporting rhodium or ruthenium on a graphite support are not particularly limited. In general, however, the immersion method is used. For example, a rhodium compound or ruthenium compound as the catalyst component described above is dissolved in an appropriate solvent, e.g., water, and a graphite is immersed in the resultant solution to thereby infiltrate the solution into the graphite for support (impregnation supporting). Thereafter, the solvent is removed under vacuum, and a reduction treatment is conducted if desired and necessary. This reduction treatment may be performed either by the gas-phase reduction method or the liquid-phase reduction method. However, the liquid-phase reduction method is preferred in that since reduction proceeds under milder conditions, a catalyst containing highly dispersed metal particles having reduced unevenness (variation) of particle diameter is obtained, and moreover the use of this catalyst results in a reduced loss of epoxy groups.

Specifically, these methods for reduction treatment may be conducted in the following manners. In the case where reduction is conducted in a gas phase using hydrogen gas, a temperature of from 100 to 600° C., preferably from 150 to 500° C., is used. Besides hydrogen, examples of the reducing agent usable here include carbon monoxide. The reducing agent may be used after having been diluted with an inert gas, e.g., nitrogen or argon. In the case where reduction is conducted in a liquid phase, a preferred method comprises supporting rhodium or ruthenium, subsequently treating the supported noble metal with an alkaline aqueous solution to insolubilize and fix the metal as a hydroxide, and then reducing the hydroxide. Preferred examples of the alkaline aqueous solution used for the insolubilization and fixation include ammonia water and an aqueous solution of an alkali metal hydroxide such as sodium hydroxide or potassium hydroxide. However, ammonia water is most preferred from the standpoints of the easiness of washing with water after the insolubilization and fixation and of avoiding the influences of residual alkali metal cations, etc.

The amount of an alkali to be used is preferably from 3 to 100 equivalents, more preferably from 6 to 50 equivalents, to the rhodium or ruthenium. The treatment with an alkaline aqueous solution is conducted preferably at a temperature of from 20 to 90° C.; Especially in the case of using ammonia water, the treatment is more preferably conducted at 20 to 50° C. because use of a temperature higher than 50° C. results in considerable ammonia liberation (desorption).

After the insolubilization and fixation with an alkaline aqueous solution, the catalyst is taken out by filtration and sufficiently washed with ion-exchanged water, etc. Especially when an aqueous solution of an alkali metal hydroxide was used, sufficient washing is necessary because the catalytic activity in hydrogenation is lessened by residual alkali metal cations, e.g., $Na^+$ or $K^+$.

The catalyst obtained through the insolubilization and fixation is preferably reduced in a liquid phase with formalin, formic acid, or methanol. The use amount of these reducing agents is generally from 3 to 100 equivalents, preferably from 6 to 50 equivalents, to the rhodium or ruthenium. This reduction is conducted at a temperature of generally from 20 to 120° C., preferably from 50 to 100° C. The catalyst which has undergone the liquid-phase reduction is recovered by filtration, sufficiently washed with ion-exchanged water, etc., and then dried, before it can be used for hydrogenation reaction. As a result of the liquid-phase reduction, the metal particles supported on the support come to have a reduced particle diameter and to be evenly distributed. This is thought to bring about a reduced loss of epoxy groups.

The amount of the catalyst to be used for the hydrogenation reaction is preferably from 0.1 to 100 parts by weight, more preferably from 5 to 50 parts by weight, per 100 parts by weight of the starting material. However, any desired catalyst amount can be selected in a range where practical reaction rates are obtainable, according to various conditions including reaction temperature and pressure.

The temperature at which the hydrogenation reaction of the present invention is conducted is generally from 30 to 150° C., preferably from 50 to 100° C., because too low reaction temperatures result in too low reaction rates, while too high temperatures result in the hydrogenation and decomposition of epoxy groups. The pressure for the reaction is generally from 1 to 30 MPa, preferably from 3 to 10 MPa.

For carrying out the reaction, either a liquid-phase suspension reaction system or a fixed-bed reaction system can be employed. An ether such as tetrahydrofuran (THF) or dioxane is preferably used as a reaction solvent from the standpoint of the solubility of the starting material.

After the hydrogenation reaction is carried out according to the process of the present invention, the catalyst is filtered off and any volatile ingredient is then removed by distillation. Thus, the target reaction product can be obtained.

EXAMPLES

The present invention will be explained below in more detail by reference to Examples, but the scope of the invention should not be limited to these Examples.

Example 1

In 6.0 g of water was dissolved 673 mg of 37.1 wt % rhodium chloride. Thereto was added 4.75 g of a graphite (TIMREX HSAG100, manufactured by TIMCAL; specific surface area, 130 $m^2/g$) to infiltrate the solution into the graphite for support. Thereafter, the solvent was removed by vaporization, and the graphite was dried in an argon gas stream at 150° C. for 2 hours. This dried graphite was subjected to gas-phase reduction in a hydrogen gas stream at 300° C. for 2 hours to obtain a 5 wt % rhodium/graphite catalyst.

Into a spinner stirring type autoclave having a capacity of 70 ml were introduced 5 g of tetrahydrofuran (THF), 5 g of 2,2-di(p-glycidoxyphenyl)propane (manufactured by Yuka Shell Epoxy K.K.; Epikote 828; epoxy equivalent 186), and 0.25 g of the above catalyst obtained through reduction. Hydrogen gas was forced into the autoclave to 15 MPa at room temperature. Thereafter, the contents were heated to 50° C. and reacted for 3 hours. After the reaction, the catalyst was filtered off, and the volatile ingredient was distilled off under reduced pressure. The reaction product obtained was examined for the degree of aromatic ring hydrogenation by $^1$H-NMR spectrometry and for epoxy equivalent by titration with perchloric acid (JIS K7236). The epoxy equivalent means the number of grams of the epoxy resin containing 1 mol of epoxy groups. The results obtained are shown in Table 1.

Example 2

A catalyst was prepared in the same manner as in Example 1, except that another graphite (TIMREX HSAG300, manufactured by TIMCAL; specific surface area, 280 $m^2/g$) was used. In the same manner as in Example 1, hydrogenation reaction was conducted and the degree of aromatic ring hydrogenation and the epoxy equivalent were determined. The results obtained are shown in Table 1.

Comparative Example 1

A catalyst was prepared in the same manner as in Example 1, except that another graphite (manufactured by Kishida Chemical Co., Ltd.; specific surface area, 2.9 $m^2/g$) was used. In the same manner as in Example 1, hydrogenation reaction was conducted and the degree of aromatic ring hydrogenation and the epoxy equivalent were determined. The results obtained are shown in Table 1.

Comparative Example 2

A catalyst was prepared in the same manner as in Example 1, except that active carbon (CX-2, manufactured by Mitsubishi Chemical Corp.; specific surface area, 1,200 $m^2/g$) was used. In the same manner as in Example 1, hydrogenation reaction was conducted and the degree of aromatic ring hydrogenation and the epoxy equivalent were determined. The results obtained are shown in Table 1.

Example 3

A catalyst was prepared in the same manner as in Example 1, except that 654 mg of ruthenium chloride was used. Hydrogenation reaction was conducted and the degree of aromatic ring hydrogenation and the epoxy equivalent were determined, in the same manner as in Example 1 except that the reaction was conducted at 80° C. The results obtained are shown in Table 1.

Comparative Example 3

A catalyst was prepared in the same manner as in Comparative Example 2, except that 654 mg of ruthenium chloride was used. Hydrogenation reaction was conducted and the degree of aromatic ring hydrogenation and the epoxy equivalent were determined, in the same manner as in Comparative Example 2 except that the reaction was conducted at 80° C. The results obtained are shown in Table 1.

Comparative Example 4

A catalyst was prepared in the same manner as in Comparative Example 3, except that 654 mg of ruthenium chloride was used. Hydrogenation reaction was conducted and the degree of aromatic ring hydrogenation and the epoxy equivalent were determined, in the same manner as in Comparative Example 3 except that the reaction was conducted at 80° C. The results obtained are shown in Table 1.

Comparative Example 5

A catalyst was prepared in the same manner as in Example 1, except that $SiO_2$ (D-150-300A, manufactured by Dohkai Chemical Industry Co., Ltd.; specific surface area, 190 $m^2/g$; pore diameter, 295 A) was used. In the same manner as in Example 1, hydrogenation reaction was conducted and the degree of aromatic ring hydrogenation and the epoxy equivalent were determined. The results obtained are shown in Table 1.

Comparative Example 6

A catalyst was prepared in the same manner as in Example 1, except that $SiO_2$ (Cariact Q-50, manufactured by Fuji-Silysia Chemical, Ltd.; specific surface area, 80 $m^2/g$; pore diameter, 500 Å) was used. Hydrogenation reaction was conducted and the degree of aromatic ring hydrogenation and the epoxy equivalent were determined, in the same manner as in Example 1 except that the reaction was conducted at 100° C. The results obtained are shown in Table 1.

TABLE 1

|  | Support | Specific surface area ($m^2/g$) | Degree of aromatic ring hydrogenation (%) | Epoxy equivalent (g/eq.) |
|---|---|---|---|---|
| Ex. 1 | HSAG100 | 130 | 100 | 208 |
| Ex. 2 | HSAG300 | 280 | 70 | 205 |
| Comp. Ex. 1 | graphite (manuf. by Kishida Chemical) | 2.9 | 9 | 182 |
| Comp. Ex. 2 | active carbon CX-2 | 1200 | 43 | 198 |
| Ex. 3 | HSAG100 | 130 | 64 | 211 |
| Comp. Ex. 3 | graphite (manuf. by Kishida Chemical) | 2.9 | 53 | 218 |
| Comp. Ex. 4 | active carbon CX-2 | 1200 | 30 | 202 |
| Comp. Ex. 5 | $SiO_2$ (D-150-300A, manuf. by Dohkai Chemical) | 190 | 13 |  |
| Comp. Ex. 6 | $SiO_2$ (Cariact Q-50, manuf. by Fuji-Silysia Chemical) | 80 | 33 |  |

Example 4

Into an induction stirring type autoclave having a capacity of 200 ml were introduced 30 g of THF, 5 g of 2,2-di(p-glycidoxyphenyl)propane, and 0.5 g of the catalyst used in Example 1. After hydrogen gas was forced into the autoclave to 2 MPa, the contents were heated to 70° C. At 70° C., hydrogen gas pressure was elevated to 7 MPa and the epoxy compound was reacted for 2 hours. After the reaction, the reaction mixture was treated and analyzed in the same manner as in Example 1. The results obtained are shown in Table 2.

Example 5

In 12 ml of water was dissolved 1.25 g of 40 wt % rhodium chloride. Thereto was added 9.5 g of a graphite (TIMREX HSAG100, manufactured by TIMCAL; specific surface area, 130 $m^2/g$) to infiltrate the solution into the graphite for support. Thereafter, the solvent was removed under reduced pressure. This graphite was added to an aqueous solution prepared by dissolving 1.17 g of NaOH in 12 ml of $H_2O$ to conduct fixation treatment at room temperature. The graphite was recovered by filtration and then sufficiently washed with ion-exchanged water. Four grams of this catalyst obtained through fixation was added to a mixture of 3.5 g of 37% HCHO and 20 ml of $H_2O$, and the resultant mixture was held at 100° C. for 2 hours to conduct reduction treatment. Thereafter, the catalyst was recovered by filtration, washed with ion-exchanged water, and then vacuum-dried at 50° C. Using 0.5 g of the catalyst thus obtained, reaction, etc. were conducted in the same manner as in Example 4. The results obtained are shown in Table 2.

Example 6

To a mixture of 0.88 g of 28 wt % aqueous $NH_3$ solution and 6 ml of $H_2O$ was added 5 g of the catalyst obtained through infiltration for support in the same manner as in Example 5. This mixture was stirred at room temperature for 2 hours to conduct fixation treatment. The catalyst was recovered by filtration and then washed with ion-exchanged water. This catalyst was added to a mixture of 2 g of formic acid and 20 ml of water, and the resultant mixture was heated at 70° C. for 2 hours to conduct reduction treatment. Thereafter, the catalyst was further treated in the same manner as in Example 5. Using the catalyst thus obtained, reaction, etc. were conducted. The results obtained are shown in Table 2.

TABLE 2

|  | Fixing agent | Reducing agent | Degree of aromatic ring hydrogenation (%) | Percentage of epoxy loss (%) |
|---|---|---|---|---|
| Example 4 | none | $H_2$ | 100 | 5.8 |
| Example 5 | NaOH | HCHO | 100 | 2.0 |
| Example 6 | $NH_3$ aq. | HCOOH | 100 | 2.5 |

The percentage of epoxy loss shown in Table 2 was calculated in the following manner. When the epoxy equivalent of a substrate which has undergone 100% hydrogenation with no loss of epoxy groups is taken as "A" (in the Examples and Comparative Examples, A=192) and that of a sample tested is taken as "B", then the theoretical amount of epoxy groups is 1/A (eq./g) and the found amount of epoxy groups is 1/B (eq./g). Consequently, the percentage of epoxy loss is defined as:

$$\text{Percentage of epoxy loss} = \frac{1/A - 1/B}{1/A} \times 100 = (1 - A/B) \times 100.$$

As described above in detail, according to the present invention, in which a catalyst comprising rhodium or ruthenium supported on a carbonaceous support having a specific surface area is used, not only a compound having at least one epoxy group can be hydrogenated selectively at the unsaturated bond(s) thereof, but also the catalyst can be easily separated from the reaction mixture. Furthermore, the compound having at least one epoxy group obtained by the process of the present invention is a highly pure compound reduced in the content of chlorine which exerts adverse influences in various applications, and hence has an exceedingly high industrial value.

What is claimed is:

1. A process for producing a compound having at least one epoxy group, which comprises:

subjecting a compound having at least one carbon—carbon unsaturated bond and at least one epoxy group to selective hydrogenation in the presence of a catalyst comprising at least one of rhodium and ruthenium supported on a carbonaceous support, the carbonaceous support having a specific surface area of from 5 to 600 m$^2$/g, to thereby selectively hydrogenate said at least one carbon—carbon unsaturated bond.

2. The process of claim 1, wherein said at least one carbon—carbon unsaturated bond is a component of an aromatic ring.

3. The process of claim 1, wherein the carbonaceous support is a graphite.

4. The process of claim 1, wherein the catalyst comprises rhodium supported on the carbonaceous support.

5. The process of claim 1, wherein the catalyst is a catalyst obtained by a method comprising: supporting a rhodium compound or a ruthenium compound on the carbonaceous support; and subjecting the support having the rhodium compound or ruthenium compound to reduction treatment in a liquid phase.

6. The process of claim 5, wherein the catalyst is a catalyst obtained by a method comprising: supporting a rhodium compound or a ruthenium compound on the carbonaceous support; treating the support having the rhodium compound or ruthenium compound with an alkaline aqueous solution; and subjecting the treated support to reduction treatment in a liquid phase.

7. The process of claim 1, wherein an ether is used as a reaction solvent.

8. The process of claim 1, wherein the hydrogenation reaction is conducted at a temperature of from 30 to 150° C. and a pressure of from 1 to 30 MPa.

9. The process of claim 1, wherein the compound having at least one carbon—carbon unsaturated bond and at least one epoxy group is an aromatic compound having at least one epoxy group.

10. The process of claim 9, wherein the aromatic compound having at least one epoxy group is a compound obtained by reacting epichlorohydrin with a polyhydric phenol.

* * * * *

UNITED STATES PATENT AND TRADEMARK OFFICE
CERTIFICATE OF CORRECTION

PATENT NO. : 6,130,344

DATED : October 10, 2000

INVENTOR(S): Yoshinori HARA, et al.

It is certified that an error appears in the above-identified patent and that said Letters Patent is hereby corrected as shown below:

On the Title Page, Item [75], the Inventors Information is incorrect. Item [75] should read as follows:

--[75] Inventors: Yoshinori Hara; Hiroko Takahashi,
                both of Kanagawa, Japan --

Signed and Sealed this

Eighth Day of May, 2001

Attest:

NICHOLAS P. GODICI

Attesting Officer      Acting Director of the United States Patent and Trademark Office